(12) United States Patent
Otten

(10) Patent No.: US 9,145,959 B2
(45) Date of Patent: Sep. 29, 2015

(54) GEAR ASSEMBLY

(71) Applicant: Deere & Company, Moline, IL (US)

(72) Inventor: Ulrich Otten, Speyer (DE)

(73) Assignee: DEERE & COMPANY, Moline, IL (US)

(*) Notice: Subject to any disclaimer, the term of this patent is extended or adjusted under 35 U.S.C. 154(b) by 68 days.

(21) Appl. No.: 13/691,133

(22) Filed: Nov. 30, 2012

(65) Prior Publication Data

US 2013/0095975 A1    Apr. 18, 2013

Related U.S. Application Data

(63) Continuation of application No. PCT/EP2011/058941, filed on May 31, 2011.

(30) Foreign Application Priority Data

Jun. 1, 2010 (DE) .......................... 10 2010 029 597

(51) Int. Cl.
*F16H 37/04* (2006.01)

(52) U.S. Cl.
CPC ............ *F16H 37/042* (2013.01); *F16H 37/046* (2013.01)

(58) Field of Classification Search
CPC  F16H 37/042; F16H 37/046; F16H 2037/047
USPC .................................. 475/207, 302, 317, 319
See application file for complete search history.

(56) References Cited

U.S. PATENT DOCUMENTS

| 4,244,232 A | 1/1981 | Murayama |
| 2007/0131046 A1 | 6/2007 | Borgerson |
| 2009/0017957 A1* | 1/2009 | Triller et al. .................. 475/207 |
| 2010/0116615 A1* | 5/2010 | Oba et al. ..................... 192/84.3 |

FOREIGN PATENT DOCUMENTS

| DE | 102006058831 A1 | 7/2007 |
| EP | 0389105 A1 | 9/1990 |
| EP | 1624232 A1 | 2/2006 |
| EP | 1961994 A2 | 8/2008 |

(Continued)

OTHER PUBLICATIONS

German Search Report dated Nov. 19, 2012 (5 pages).

(Continued)

*Primary Examiner* — Huan Le

(57) ABSTRACT

A transmission assembly for an agricultural vehicle comprises a first transmission unit, a second transmission unit coupled to the first and a third transmission unit coupled to the second. The second transmission unit comprises an input shaft, an output shaft and two countershafts, the input shaft drives the countershafts and the countershafts drive the output shaft. The third transmission unit comprises an input shaft, which is drivingly coupled to an output shaft located in parallel thereto. The first transmission unit comprising a planetary drive and a sun gear of the first transmission unit, the input shaft and the output shaft of the second transmission unit, and the input shaft of the third transmission unit are located coaxial to each other, wherein an output of the first transmission unit is connected to the input shaft of the second transmission unit and the output shaft of the second transmission unit is connected to the input shaft of the third transmission unit.

19 Claims, 5 Drawing Sheets

(56) References Cited

FOREIGN PATENT DOCUMENTS

| EP | 1961996 | A2 | 8/2008 |
|---|---|---|---|
| GB | 1605068 | A | 12/1981 |

OTHER PUBLICATIONS

The International Search Report and the Written Opinion of the International Searching Authority dated Sep. 2, 2011 (14 pages).

* cited by examiner

GEAR ASSEMBLY

FIELD OF THE DISCLOSURE

The disclosure relates to a gear assembly for an agricultural vehicle, comprising a first gear unit having an output side, a second gear unit having an output side and being coupled to the first gear unit on the output side of the first gear unit, and a third gear unit that is coupled to the second gear unit on the output side of the second gear unit, wherein the second gear unit comprises an input shaft, an output shaft and two layshafts, wherein the input shaft of the second gear unit can be brought into driving engagement with the layshafts and the layshafts can be brought into driving engagement with the output shaft of the second gear unit, and wherein the third gear unit comprises an input shaft and an output shaft disposed parallel to the input shaft, with the input shaft of the third gear unit being selectively brought into driving engagement with the output shaft of the third gear unit. The disclosure further relates to a gear housing arrangement for such a gear assembly.

BACKGROUND OF THE DISCLOSURE

Gear assemblies for agricultural work vehicles are known from the prior art, for example for tractors or harvesting machines, the gear assemblies having a gear system implemented by a plurality of gear units arranged in succession. Such gear assemblies are used to meet the high demands required by a gear spread which is as sensitive and as extensive as possible, as is required in agricultural work vehicles. Moreover, for the same reasons, such gear assemblies are also used in the field of construction machines.

EP 1624232 A1 discloses a gear assembly for a work vehicle comprising a plurality of gear units arranged in succession. A first gear unit is configured as a reverse gear and connected to a second gear unit. The second gear unit has an input shaft connected to a distributor stage and an output shaft. Moreover, two layshafts are provided in the second gear unit. The layshafts are driven via the distributor stage. By way of toothed wheel pairs, which are arranged by way of toothed wheels on the layshafts and the output shaft, the output shaft may be driven with different gear stages. The output shaft of the second gear unit is connected to a third gear unit. The third gear unit represents a secondary transmission and permits a further staging of the gear stages selected in the second gear unit. The disclosed gear assembly is designed to permit advantageous gear shifts at a relatively low construction cost, where there is a corresponding total gear spread. The selected design which is additionally required by the type of gear units selected, however, has only a low degree of compactness and variability, namely based on the selected construction, possibilities for variation relative to predetermined and/or selected maximum or minimum output speeds only being able to be implemented with difficulty and only with a relative high structural cost and a high number of different parts. In this regard, for example, the axial distance of at least one layshaft has to be altered, which requires further structural measures, such as the adaptation of shift forks, etc. The same applies to possibilities for increasing and adapting the power spectrum predetermined by the gear assembly, as well as possibilities for combining with additional or auxiliary drives.

A further drawback is that both the design of the gear assembly disclosed in EP 1624232 A1 and the design of other known gear assemblies of the aforementioned type, have an irregular path of the efficiency and/or power loss which is associated with high vibrations, depending on the rotational speed and/or driving speed of the respective vehicle, which is a drawback for implementing an automatic gear system, in particular when applying driving strategies with regard to optimized fuel consumption, as such paths which are irregular and/or associated with vibrations, may rapidly result in oscillation shifts. Moreover, such a gear assembly is also only suitable for use in an agricultural machine to a limited extent, such as for example in a tractor, as a power take-off shaft may only be connected indirectly to the input shaft of the gear assembly.

SUMMARY OF THE DISCLOSURE

The object of the disclosure is to specify a gear assembly of the type mentioned in the introduction by which one or more of the aforementioned problems are overcome.

According to the disclosure a gear assembly of the type mentioned in the introduction is configured such that the first gear unit is designed as a planetary gear arrangement and a sun gear is associated with the planetary gear arrangement, the input shaft and the output shaft of the second gear unit and the input shaft of the third gear unit are disposed coaxially with respect to one another, wherein an output of the planetary gear arrangement is connected fixedly in terms of rotation to the input shaft of the second gear unit and the output shaft of the second gear unit is connected fixedly in terms of rotation to the input shaft of the third gear unit. The planetary gear arrangement is advantageously characterized by its small structural dimensions in the axial direction inside the gear assembly. Also, by the use of the planetary gear arrangement, a rotational axis for the entire gear assembly is predetermined on which both the sun gear, the input shafts of the second and third gear unit and the output shaft of the second gear unit may be arranged. By the aforementioned shafts and/or the sun gear being coaxial relative to one another, advantageous mounting possibilities for the gear components are provided, which in turn permit a compact construction with options for preassembling individual gear components and thus a lower assembly cost and a high degree of compatibility and variability is provided.

The input shaft and the output shaft of the second gear unit have a common bearing point, wherein it is possible to mount the output shaft on the input shaft, for example by forming the input shaft as a hollow shaft and mounting the output shaft inside the input shaft or vice versa. At least two bearings are provided for mounting in the common bearing point, of which one may be associated with the input shaft and one with the output shaft. By way of a common bearing point for both shafts, the constructional space is minimized along the rotational axis of the shafts.

In the second gear unit, the layshafts may be brought in driving engagement with the output shaft via different selected toothed wheel pairs, wherein clutch devices are provided on the layshafts, the clutch devices permitting an activation and/or connection of the selected toothed wheel pairs. Conventionally, for each clutch device two toothed wheel pairs are activated and/or connected, wherein the connection of a greater or lower number of toothed wheel pairs to one clutch device is also conceivable. The number of clutch devices on the respective layshafts may vary, wherein one, two or more may be provided. The term "clutch device" here and below, in particular in the claims, is to be understood as representative of devices by which toothed wheel pairs may be activated and/or connected. In this regard, synchronous devices or even multi-plate clutches, dog clutches, or the like may be used. Preferably, however, here and below synchronous devices may be used as clutch devices, wherein alternatively multi-plate clutches or dog clutches, or the like may also be used. Depending on the design of the second gear unit, the toothed wheel pairs may vary in number and size, and may be designed differently, in particular depending on the spacings of the layshafts from the input shaft and/or output shaft. Thus, the gear assembly may be adapted to the power requirement desired by a consumer. With the same spacings of the layshafts from the input shaft and/or output shaft, substantially stepless gear step jumps may be implemented by the second gear unit, wherein on the layshafts the synchronized toothed wheels of one layshaft are identical to the synchronized toothed wheels of the other layshaft. This enables the toothed wheel pairs on both layshafts to be able to have the same number of teeth, the same tooth shape and in terms of production technology, even the same number of parts. This results in a cost-effective design of the second gear assembly. Stepless gear step jumps may be advantageous, primarily in agricultural vehicles, for example tractors, wherein the size of the gear step jumps is mainly determined by the characteristic of a drive machine of the vehicle, and accordingly able to be adapted to the specific requirements of the respective agricultural vehicle. Generally, stepless gear step jumps of 16% to 25% are common for agricultural vehicles. With a gear assembly according to the disclosure for the second gear unit with the same axial distances of the layshafts from the input and/or output shaft, toothed wheel pairs may be formed by which stepless gear step jumps may be achieved in the aforementioned range with relatively small deviations of only +/−1.0% points. In this case, a module of the same size may be used for all toothed wheels, which in turn means a cost advantage during the production of the toothed wheels (minimizing the costs for the set-up time of the gear-cutting machines). If it is desired to obtain a deviation of less than +/−1.0% points, this may be achieved by a choice of different modules for the respective toothed wheel pairs (wheel chains). With an irregular axial distance of the layshafts from the input and/or output shaft, variable gear step jumps may also be implemented by the second gear unit. In this case, the synchronized toothed wheels on the one layshaft are no longer the same as the opposing synchronized toothed wheels of the other layshaft. However, almost the entire remaining structure of the second gear assembly remains unaltered (such as the housing, clutch device, mounting of shafts, shifting devices as well as assembly and adjustment sequences of the gear system). Only the shift fork(s) of the shifting device have to be adapted accordingly to the new geometry. Variable gear step jumps are used in agricultural vehicles and utility vehicles when, for example, transport purposes are a priority. The gear assembly is thus characterized by its high degree of compatibility and variability in addition to the aforementioned high degree of compactness, as it permits the most varied uses and requirements to be met, both in the agricultural vehicle field and in the utility vehicle field, without fundamentally different gear designs having to be used.

The gear assembly may have a gear shaft which serves as an input shaft for the planetary gear arrangement and from there passes through the second and third gear units and exits the gear assembly where it is available for serving as an input shaft to a further gear unit. To this end, the gear shaft serving as an input shaft for the planetary gear arrangement may be connected thereto, for example, on the planet spider side and may extend coaxially to the sun gear, to the input shaft and the output shaft of the second gear unit and to the input shaft of the third gear unit, with the gear shaft thus extending through the first, second and third gear units. The sun gear of the planetary gear arrangement may be connected, for example, to the input shaft of the second gear unit. The input shaft of the second gear unit, the output shaft of the second gear unit and the input shaft of the third gear unit may be configured as hollow shafts, through which the gear shaft may extend. The gear shaft may thus have an end section that extends outside the gear assembly and which may be used as a drive for a further gear unit. For example, the gear shaft end section may serve as a drive for a power take-off shaft gear box which may be connected as a further gear unit to the gear assembly.

Relative to the third gear unit, the input shaft is able to be brought in driving engagement with the output shaft via different toothed wheel pairs. To this end, one (or more) clutch device(s) may be provided on the input shaft of the third gear unit or even on the output shaft of the third gear unit, the clutch device(s) permitting a choice of corresponding toothed wheel pairs. The output shaft of the third gear unit is arranged parallel to the input shaft of the third gear unit and may thus be used as the input shaft for a further gear unit. For example, the output shaft of the third gear unit may serve as a drive for a differential gear arrangement which may be connected as a further gear unit to the gear assembly. The output shaft of the third gear unit may be provided with a bevel gear via which the drive of a differential gear arrangement may be initiated. The third gear unit may thus represent a set of gears, by which different speed levels may be implemented depending on the gear stages provided by the second gear unit.

Moreover, in the third gear unit between the input shaft and the output shaft, a further clutch device with an associated toothed wheel pair may also be arranged, by which the input shaft may be brought in driving engagement with the output shaft. As a result, in addition to the above-mentioned toothed wheel pairs of the clutch device of the third gear unit an additional driving engagement between the input shaft and the output shaft may be provided in the third gear unit in order, for example, to achieve a maximum output speed. Thus, for instance an additional transmission ratio may be provided which permits a maximum output speed which is above the output speeds achievable by the above-mentioned toothed wheel pairs of the clutch device. The toothed wheel pairs of the further clutch device are additionally replaceable and/or variable independently of the other toothed wheel pairs, so that without a high assembly cost it is possible to vary the maximum output speed. Thus the greatest speed of an agricultural vehicle may be adapted to legal requirements, for example, without having to undertake a gear change in the differential gear arrangement, for example, as is common in conventional gear assemblies. When changing the transmission ratio of the differential gear arrangement, moreover, the speeds in all other ratio groups are also altered which is a drawback for the applications thereof. Thus an adaptation of the maximum speed by altering the toothed wheel pair of the clutch device in the third gear unit may be adapted very accurately and very closely to the legal requirements in different countries, and namely also retrospectively and correspondingly cost-effectively without the remaining speeds and gear stages of the gear assembly being affected thereby.

The planetary gear arrangement is configured to be reversed and/or is reversible, preferably with dual planetary gear sets, wherein between the sun gear and a hollow wheel, two planetary wheel sets meshing with one another are arranged, which are driven via a common planet spider. For one operating direction, the sun gear may be connected fixedly in terms of rotation to the planet spider, wherein the hollow wheel runs freely. For an opposing operating direction, the sun gear may run released from the planet spider, wherein the hollow wheel is correspondingly blocked. A further arrangement of the planetary gear arrangement is also conceivable by the sun gear being used, for example, as a driven element, wherein the input shaft of the second gear unit would be connected to the planet spider as an output element. Also, the arrangement of the hollow wheel as an input or output element is conceivable.

In a further gear unit an output shaft may be arranged in parallel with the output shaft of the third gear unit and may optionally be connected in via a toothed wheel pair and a clutch device connected thereto. Thus, proceeding from the output shaft of the third gear unit, for example, a front-wheel drive may be implemented which may be connected in and/or disconnected, in parallel and independent of a differential gear arrangement connected to the gear assembly. The further gear unit is thus optionally able to be connected to the third gear unit. A vehicle provided with the gear assembly according to the disclosure may thus also be designed as a four-wheel drive vehicle without a specific gear assembly having to be designed. In this case, the number of different varieties of the gear assembly also comes to bear once again.

In a further embodiment of the gear assembly, an intermediate gear unit may be arranged between the second and third gear unit, through which the output shaft of the second gear unit may be coupled to the input shaft of the third gear unit, wherein the intermediate gear unit comprises a reduction gear arrangement which may be connected in. The speed provided by the output shaft of the second gear unit in this case is either transmitted unaltered to the input shaft of the third gear unit or reduced by the reduction gear arrangement and provided in reduced form to the input shaft of the third gear unit. Such a reduction gear arrangement is also denoted by the person skilled in the art as a crawling gear module, by which extremely low driving speeds may be implemented. The intermediate gear unit may thus optionally be arranged in the vehicle structure between the second and third gear units, without greater assembly costs having to be applied. Depending on the required application and/or performance profile, a vehicle provided with the gear assembly according to the disclosure may be provided with a crawling gear module, without a specific gear assembly having to be designed. In this case, the number of different varieties of the gear assembly also comes to bear.

The layshafts arranged in the second gear unit are arranged relative to a gear housing and/or housing module of the second gear unit above the input shaft and output shaft, wherein the clutch devices in the second gear unit may comprise electromagnetic actuators which are arranged relative to the housing module of the second gear unit below the output shaft. The layshafts are thus located in the upper part of the housing module and are advantageously positioned above the oil level of the gear assembly, whereby churning losses may be reduced and/or improved efficiency achieved. The electromagnetic actuators which produce the shifting forces for the synchronization on the clutch devices and/or which forward the shifting forces to corresponding shifting devices, are located below the output shaft of the second gear unit in the oil flow of the gear assembly and may be optimally cooled thereby.

In the second gear unit between the input shaft and the layshafts a dual clutch device may be arranged which for the one layshaft comprises a first additional clutch device and for the other layshaft a second additional clutch device, by which the input shaft may be brought in driving engagement with the respective layshaft. Such an embodiment of the second gear unit represents a dual clutch transmission and permits shifting between the gear stages without interrupting the driving engagement between the input shaft and output shaft. The arrangement is such that the successive gears are assigned alternately to one of the two layshafts, so that for example when shifting from one gear to the next gear the layshaft assigned to the next gear when the first additional clutch device is open may be brought by the output shaft via the clutch devices for synchronizing to the speed corresponding to the gear, before the first additional clutch device is closed and at the same time the second additional clutch device of the other layshaft is opened. Thus by mutual actuation of the additional clutch devices without interrupting the driving engagement and under load, an output torque for the output shaft may be transmitted from one layshaft to the other. The second gear unit, however, may also be operated without the two additional clutch devices, i.e. without a dual clutch device. In this case, both layshafts are in permanent driving engagement with the input shaft. The shifting from one gear to another gear takes place solely by the clutch devices for synchronization correspondingly connected to the toothed wheel pairs, but by interrupting the respective driving engagement. Such a configuration of the second gear unit represents a manual transmission. Also in this case, the number of different varieties of the entire gear assembly comes to bear again, by a gear assembly being able to be optionally implemented with dual clutch transmission or with manual transmission without substantial structural cost.

According to the disclosure, a gear housing arrangement designed for the above-described gear assembly is also proposed, wherein the gear housing arrangement is of modular construction. In this context, "modular" is intended to mean that the gear housing arrangement is made up of a plurality of gear housings, and a specific gear housing and/or housing module is configured for each of the above described gear units and/or for the intermediate gear unit, which in combination with the other housing modules represents the entire gear housing arrangement. The first housing module for the first gear unit has a housing wall on the input side and a housing flange on the output side. The second housing module for the second gear unit has a housing wall on the input side and a housing flange on the output side. The third housing module for the third gear unit has a housing flange on the input side, a housing wall on the output side and fastening points arranged therebetween on the inside. The housing flange of the first housing module may be fastened to the housing wall of the second housing module and the housing flange of the third housing module to the second housing module. The gear housing arrangement also comprises a housing bearing wall for the second housing module and a housing bearing wall for the third housing module, wherein the housing bearing wall for the second housing module is able to be fastened to the housing flange of the second housing module and the housing bearing wall for the third housing module to the fastening points of the third housing module arranged on the inside.

The third housing module may be fastened to the housing flange or on the housing bearing wall of the second housing module to the second housing module. The housing flange of the second housing module may in this case be dimensioned so that the housing bearing wall for the second housing module is fastened to an inner fastening surface of the housing flange and the housing flange of the third housing module on the input side to an outer fastening surface of the housing flange, so that advantageously only one joint face is formed between the second and the third housing module. As mentioned above, it is also possible to fasten the housing bearing wall of the second housing module to the housing flange thereof and the housing flange of the third housing module on the input side to the housing wall of the second housing module, wherein in this case two joint faces would be formed. Alternatively, in a similar manner, the fastening of the housing bearing wall of the second housing module may also be carried out on an internal fastening surface of the housing flange of the third housing module.

The internally arranged fastening points of the third housing module are arranged inside the housing module such that, with the housing module assembled, the mounted housing bearing wall of the third housing module is arranged between the toothed wheel pair with the further clutch device and the other toothed wheel pairs with clutch devices. Such an arrangement permits a change of the toothed wheel pair of the further clutch device in the third gear unit, i.e. of the toothed wheel pair with which the maximum output speed may be varied, to be able to be carried out in a simple and cost-effective manner, without having to dismantle the third gear unit completely. In this case, the advantages of a gear assembly according to the disclosure and/or the gear housing arrangement configured therefore with regard to a lower assembly cost, a high degree of compatibility and variability once again become clear.

Moreover, an intermediate housing module may be provided for an intermediate gear unit, which has a housing flange on the input side and a housing flange on the output side. The housing flange on the input side may be designed so that the housing flange may be fastened to the housing flange on the output side or, as described for the third housing module, to the housing bearing wall of the second housing module. The housing flange on the output side is designed such that the flange may be fastened to the housing flange of the third housing module on the input side. As a result, in the event that an intermediate gear unit is desired in the form of a crawling gear module, the assembly cost may be reduced to a minimum. The intermediate housing module may have corresponding internal bearing points, for example in the form of projections or other fastening devices, on which structural elements of the intermediate gear unit, such as for example a toothed wheel reduction gear, may be mounted. In particular in this case, the low assembly cost and high degree of compatibility and variability relative to conventional gear housing arrangements also become clear.

Moreover, a further housing module may be provided for a further gear unit, the housing module having a housing flange on the input side, wherein the housing flange may be fastened to a connecting flange arranged between the housing flange on the input side and the housing wall of the third housing module on the output side. The connecting flange may, for example, be arranged on the underside of the third housing module, to which for example a fourth gear unit configured in the form of a drive module for a front wheel drive may be fitted and/or connected. A toothed wheel pair extending through the connecting flange and the housing flange of the fourth housing module on the input side, may in this case provide the drive torque required for a front wheel drive, wherein the toothed wheel pair may be produced by a toothed wheel arranged on the output shaft of the third gear unit and by a toothed wheel arranged in the fourth gear unit. In addition to the further housing module described, also further housing modules may be connected to the existing modular gear housing arrangement. Thus, for example, via a further connecting flange a parking brake module may be connected to the third housing module, which permits the blocking of a toothed wheel arranged on the input shaft or output shaft of the third gear unit. Further connecting options for further housing modules may be provided on the housing wall of the third housing module, in order to be able to connect, for example, a differential gear arrangement or a power take-off shaft gear arrangement to the gear shaft and/or to the output shaft extending through the housing wall of the third housing module.

In addition to the already-mentioned advantages relative to compactness, compatibility and variability, the gear assembly according to the disclosure permits a discrete and regular path of the efficiency and/or power loss of the gear assembly to be provided over the entire spectrum of the rotational speed and/or driving speed of a vehicle. This is a great advantage for implementing automatic gear systems, for example when applying driving strategies with regard to optimized fuel consumption. In conventional gear assemblies as already mentioned above, an irregular path of the power loss of the gear assembly depending on the rotational speed and/or driving speed of a vehicle may be registered instead, which is not optimal for applying the aforementioned driving strategies.

BRIEF DESCRIPTION OF THE DRAWINGS

Embodiments of the disclosure are described in detail below with reference to the accompanying drawings wherein.

DETAILED DESCRIPTION OF THE DRAWINGS

Figure 1:
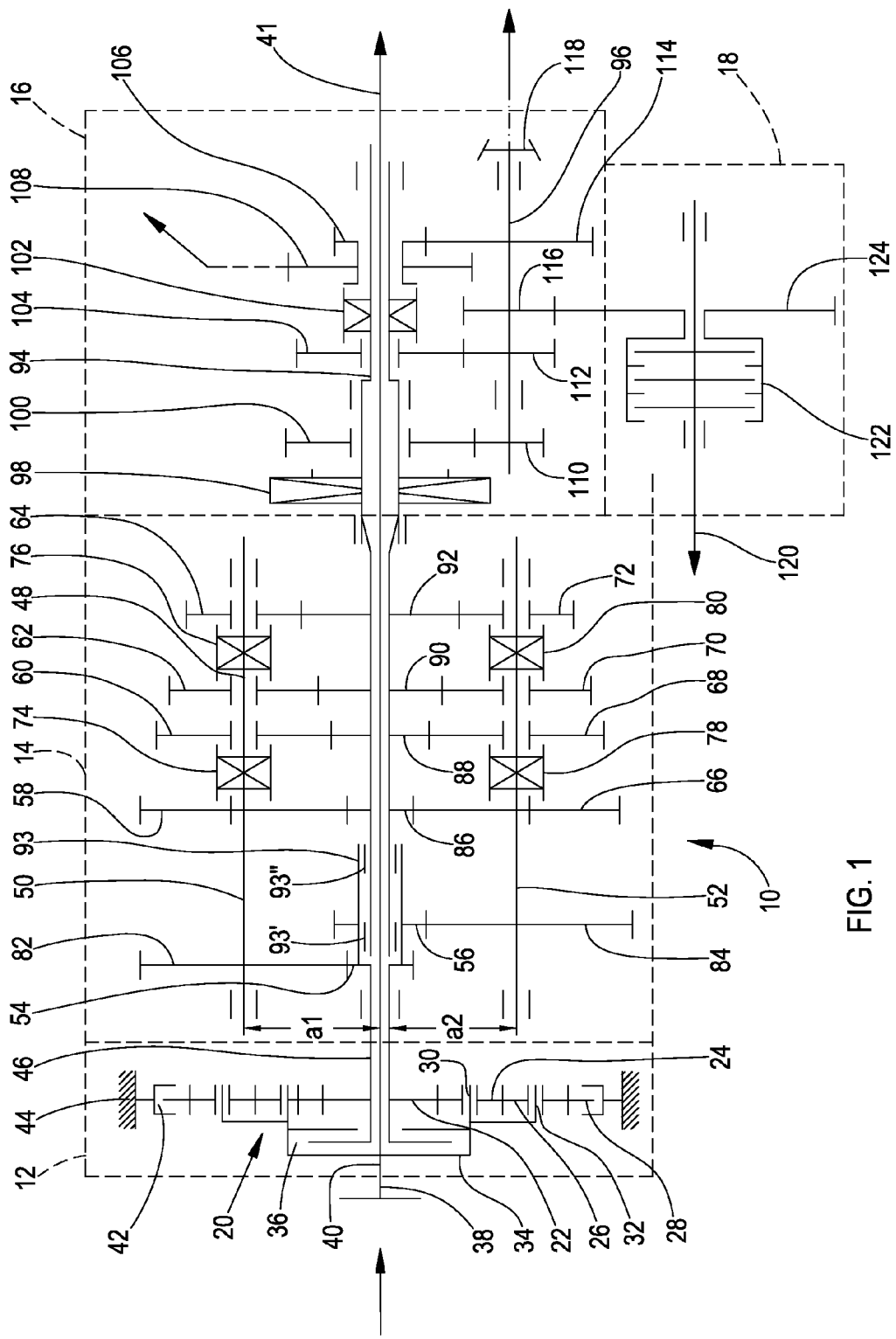
FIG. 1 is a kinematic diagram of a first gear assembly according to the disclosure.

In FIG. 1, a gear assembly 10 according to the disclosure is shown schematically. The gear assembly 10 comprises a first gear unit 12, a second gear unit 14, a third gear unit 16 and a further (fourth) gear unit 18.

The first gear unit 12 is configured as a reversible, dual planetary gear arrangement 20, which has two gear stages, wherein a sun gear 22 of the planetary gear arrangement 20 meshes with a first set of planet wheels 24. The first set of planet wheels 24 meshes, on the one hand, with the sun gear 22 and, on the other hand, with a second set of planet wheels 26. The second set of planet wheels 26 meshes in turn with a hollow wheel 28. The planet wheels 24, 26 of the first and second set are mounted on respective bearing axles 30, 32, wherein the bearing axles 30 of the first set of planet wheels 24 have a smaller spacing from the sun gear 22 than the bearing axles 32 of the second set of planet wheels 26. All the bearing axles 30, 32 and thus the first and the second set of planet wheels 24, 26 are arranged on a common planet carrier 34. A clutch device 36 is arranged between the planet carrier 34 and the sun gear 22. A gear shaft 38 serves as an input shaft 40 for the planetary gear arrangement 20 and extends through the gear assembly 10 with an end section 41 being located outside the gear assembly 10. The input shaft 40 is connected to the planet carrier 34. The hollow wheel 28 may be connected or detached via selective operation of a blocking device 42 to a housing part 44 of the gear assembly 10. The sun gear 22 is coaxially connected to an input shaft 46 of the second gear unit 14.

The first gear unit represents a so-called reverse gear arrangement and has the purpose of predetermining an output rotational direction for the gear assembly 10, wherein depending on the actuation of the clutch device 36 and/or the blocking device 42 the output rotational direction is reversible. As a result, with a vehicle driven by the gear assembly 10, a forward or reverse gear may be set. For activating the clutch device 36 and/or the blocking device 42, in each case a specific proportional valve (not shown) is arranged so that optimal driving comfort may be possible, in particular when changing the rotational direction and when starting-up.

The second gear unit 14 is configured as a spur gear arrangement and, in addition to the input shaft 46, has an output shaft 48, a first layshaft 50 and a second layshaft 52, wherein the input shaft 46 and the output shaft 48 are configured as hollow shafts and are arranged coaxially to each other and to the gear shaft 38. The input shaft 46 is provided with a first toothed wheel 54 and with a second toothed wheel 56, wherein the second toothed wheel 56 has a greater diameter than the first toothed wheel 54. The layshafts 50, 52 are provided in each case with four synchronous gears 58, 60, 62, 64 and/or 66, 68, 70, 72, with reducing diameters in each case which may be brought in driving engagement and/or connected via clutch devices 74, 76 and/or 78, 80 arranged in pairs, with the corresponding layshaft 50 and/or 52. Moreover, the layshafts 50, 52 are provided in each case with a toothed wheel 82, 84, wherein the toothed wheel 82 meshes with the toothed wheel 54 of the input shaft 46 and the toothed wheel 84 with the toothed wheel 56 of the input shaft 46. The input shaft 46 drives the first and second layshafts 50, 52 via the toothed wheel pairs 54, 82 and/or 56, 84. The output shaft 48 is provided with four toothed wheels 86, 88, 90, 92, with increasing diameters in each case, wherein the toothed wheel 86 simultaneously meshes with the synchronous gears 58, 66, the toothed wheel 88 simultaneously meshes with the synchronous gears 60, 68, the toothed wheel 90 simultaneously meshes with the synchronous gears 62, 70 and the toothed wheel 92 simultaneously meshes with the synchronous gears 64, 72. The input shaft 46 and the output shaft 48 are mounted in one another and not connected together fixedly in terms of rotation and the output shaft 48 at its end facing the input shaft 46 is radially mounted on a common bearing point 93 in the input shaft 46 on the end thereof facing the output shaft 48. For mounting the output shaft 48 in the input shaft 46, on the common bearing point 93 two bearings 93', 93" are provided, of which one is to be assigned to the output shaft 48 and one to the input shaft 46.

The third gear unit 16 comprises an input shaft 94 and an output shaft 96 arranged parallel therewith. The input shaft 94 is connected fixedly in terms of rotation to the output shaft 48 of the second gear unit 14. Arranged on the input shaft 94 of the third gear unit 16 is a first toothed wheel 100 connected to a further clutch device 98, as well as two synchronous gears 104, 106 connected to a clutch device 102 of smaller diameter, wherein the synchronous gear 104 has a greater diameter than the synchronous gear 106. A further toothed wheel 108 is connected to the synchronous gear 106 and serves as a blocking element for a parking brake device (not shown). The first toothed wheel 100 on the input shaft 94 meshes with a first toothed wheel 110 arranged opposite on the output shaft 96. The synchronous gear 104 meshes with a second toothed wheel 112 arranged opposite on the output shaft 96. The synchronous gear 106 meshes with a third toothed wheel 114 arranged opposite on the output shaft 96, wherein the cited toothed wheels 110, 112, 114 on the output shaft 96 have an increasing diameter. Between the second and the third toothed wheel 112, 114 a further toothed wheel 116 is arranged and serves as a drive gear for the further (fourth) gear unit 18. A bevel gear 118 is arranged on an end of the output shaft 96 on the output side, the bevel gear also serving as a drive gear for a further gear unit (not shown), for example as a drive gear for a differential gear arrangement flanged to the third gear unit 16. The input shaft 94 of the third gear unit 16 is configured as a hollow shaft, as is the input shaft 46 and the output shaft 48 of the second gear unit, so that the gear shaft 38 of the gear assembly 10 extends through the gear assembly 10 from an input side of the first gear unit 12 to an output side of the third gear unit 16 and is present there as the shaft end section 41 which may serve as a drive for a further gear unit such as a power take-off shaft gear box, for example. The third gear unit 16 provides a flexible arrangement of gear ratio-groups. Thus the requirements for a vehicle provided with the gear assembly 10 may be adapted to specific customer requirements.

The further (fourth) gear unit 18 comprises an output shaft 120 on which a toothed wheel 124 coupled to a clutch device 122 is arranged, which meshes with the toothed wheel 116 of the third gear unit 16 provided for driving the further gear unit 18. The output shaft 120 is arranged substantially parallel to the output shaft 96 of the third gear unit 16. By connecting the clutch device 122, a corresponding output torque may be connected into and/or disconnected from the output shaft 120. With the further (fourth) gear unit 18, for example, a front-wheel drive which is branched off from the third gear unit 16 and which may be connected in and/or disconnected via the clutch device 122, may be implemented for a vehicle provided with the gear assembly 10, wherein, for example, the output shaft 120 is connected to a drive train for a front wheel drive (not shown).

The third gear unit 16 configured as a gear system with three sets of gear ratios provides, for example, three operating modes for a vehicle configured as a tractor. A first "field work" operating mode, for example, may be designed for applications for heavy work in the field, wherein generally heavy traction work has to be performed in a low speed range (for example between 2 and 11 km/h). A second "power take-off shaft mode" operating mode, for example, may be designed for applications for lighter traction work in the field using a power take-off shaft drive, wherein an average speed range may come to bear (for example between 4.5 and 18 km/h). A third "transport" operating mode, for example, may be designed purely for transport work and provides a greater speed range (for example between 14 km/h and maximum speed). Moreover, it is common that customer demands and different legal requirements require the gear assembly 10 to be adapted to different maximum speeds. This is intended to be achieved in the most accurate manner possible. Conventionally, this is implemented by altering the transmission ratio of a differential gear arrangement (not shown) downstream of the gear transmission. This is generally cost-intensive and generally also not possible to implement in an accurate manner and would also require adapting a further gear unit 18, possibly branched off from the third gear unit 16, such as for example a front-wheel drive as has already been described above. When adapting a transmission ratio of the differential gear arrangement, moreover, the speeds are also altered in the other groups which is potentially a drawback for applications in the operating modes thereof. An adaptation of the maximum speed, however, in the gear assembly 10 shown is possible in a very accurate manner and may be easily implemented retrospectively, in a manner which is easy to assemble and which is cost-effective by adapting the toothed wheel pair of the toothed wheels 100 and 110 in the third gear unit 16. A great advantage here is that the speeds and gear stages of the other operating modes, for example "field work" and "power take-off shaft mode" remain unaltered.

The gear assembly 10 shown in FIG. 1 comprises, with the second gear unit 14, a gear unit in the form of a manual transmission in which the layshafts 50, 52 are in permanent drive by way of the input shaft 46. By actuating the clutch devices 74, 76 and/or 78, 80 the different gear stages may be adjusted wherein the actuation of the clutch devices 74, 76 and/or 78, 80 may take place by manual actuation or even automatically, for example electrically, electromagnetically or hydraulically by corresponding shifting means and actuators (not shown). In this case, every two successive gear stages are selected by actuating a clutch device 74, 76 and/or 78, 80, wherein when changing to the two next higher or lower gear stages a clutch device 74, 76 and/or 78, 80 of the respective opposing layshaft 50, 52 is selected. For the exemplary embodiment shown in FIG. 1, the gear stages 1 and 2 are selected by the clutch device 76, the gear stages 3 and 4 are selected by the clutch device 80, the gear stages 5 and 6 are selected by the clutch device 74 and the gear stages 7 and 8 are selected by the clutch device 78.

Figure 2:
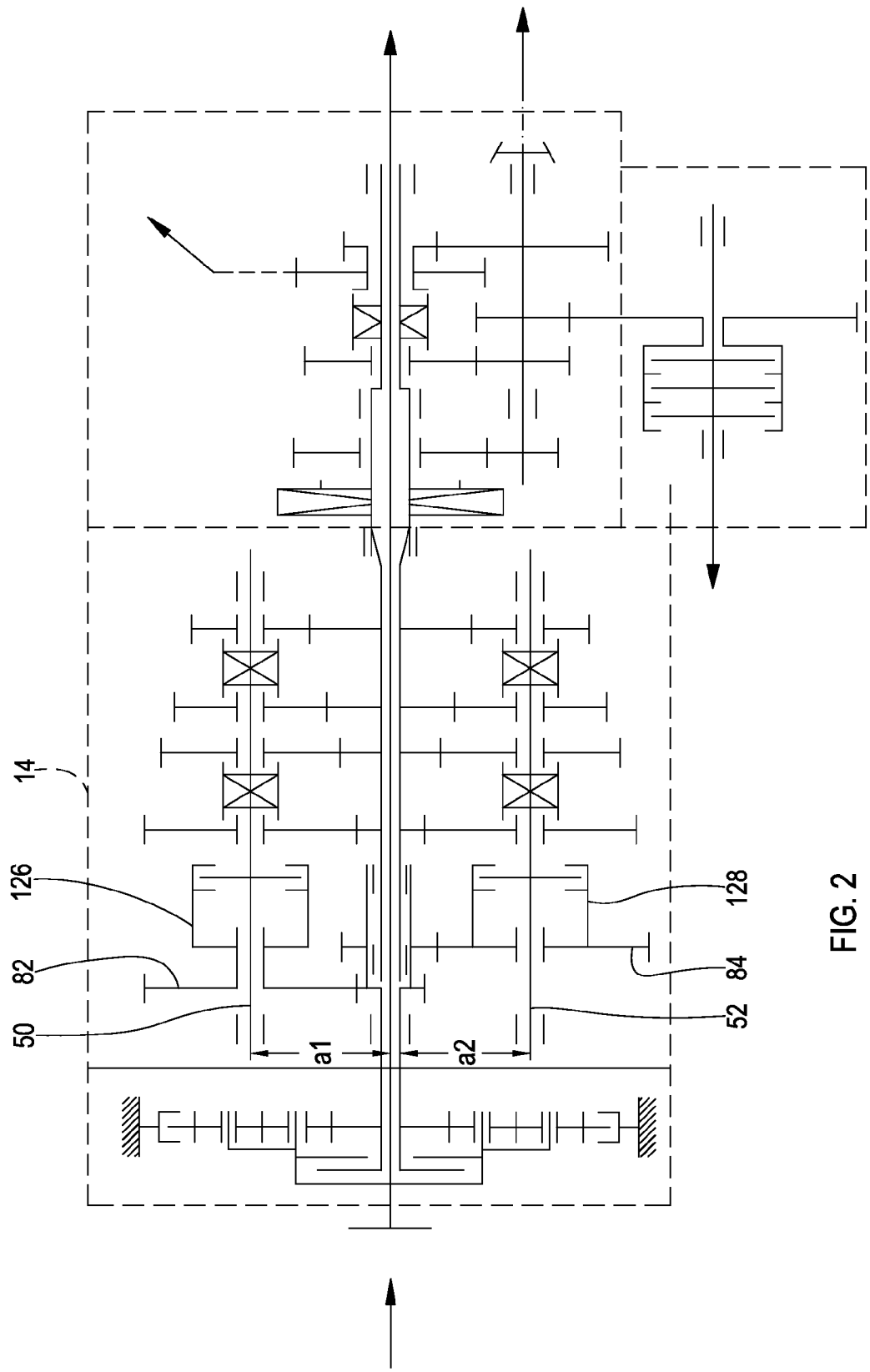
FIG. 2 is a kinematic diagram of a second gear assembly according to the disclosure.

An extended embodiment of the gear assembly is shown in FIG. 2, wherein the second gear unit 14 is configured here as a dual clutch transmission. To this end, a first clutch device 126 is arranged on the layshaft 50 and a second clutch device 128 is arranged on the layshaft 52. The remaining part of the gear assembly 10 is unaltered. The first clutch device 126 is connected to the toothed wheel 82 and the second clutch device 128 is connected to the toothed wheel 84. The clutch devices 126, 128 are configured and arranged such that by actuating the clutch devices 126, 128 the toothed wheels 82, 84 may be brought in driving engagement with the respective layshaft 50, 52. Thus the driving engagement between the input shaft 46 and the layshafts 50, 52 may be interrupted at the same time or alternately as desired. Such an embodiment of the second gear unit 14 represents a dual clutch transmission and permits shifting between the gear stages without an interruption of the driving engagement between the input shaft 46 and the output shaft 48. The arrangement is thus such that the successive gears are assigned alternately to one of the two layshafts 50, 52, so that when shifting from one gear to the next gear the layshaft 50, 52 associated with the next gear, when the clutch device 126, 128 is open, may be brought by the output shaft 48 via the clutch device 74, 76, 78, 80 to the rotational speed corresponding to the gear, before the clutch device 126, 128 of the one layshaft 50, 52 is closed and at the same time the clutch device 126, 128 of the other layshaft 50, 52 is opened. Thus by alternately actuating the clutch devices 126, 128 assigned to the layshafts 50, 52, without interrupting the driving engagement and under load, an output torque for the output shaft 48 may be transmitted from one layshaft 50, 52 to the other. For the exemplary embodiment shown in FIG. 2, the gear stages 1 and 3 are selected by the clutch device 76, the gear stages 2 and 4 are selected by the clutch device 80, the gear stages 5 and 7 are selected by the clutch device 74 and the gear stages 6 and 8 are selected by the clutch device 78.

As shown in FIGS. 1 and 2, the layshafts 50, 52 are arranged at a distance a1 and/or a2 from the input shaft and/or output shaft 46, 48. With the same axial distance of the layshafts 50, 52 from the input and output shaft 46, 48 (axial distance a1=a2) relatively constant gear stage jumps may be implemented by a gear assembly 10 according to the view in FIGS. 1 and 2, wherein the four different synchronous gears 58, 60, 62, 64 of the one layshaft 50 are identical to the synchronous gears 66, 68, 70, 72 on the second layshaft 52. This leads to a cost-effective configuration of the gear assembly 10 with relatively stepless gear stage jumps as is shown in Tables 1 and 2 for a gear assembly 10 with a manually shiftable second gear unit 14 according to FIG. 1 and in Tables 3 and 4 for a gear assembly 10 with a second gear unit 14 configured as a dual clutch transmission, according to FIG. 2. For the example, shown in Tables 1 and 2, of a combination of a number of teeth of the synchronous gears 58, 60, 62, 64, 66, 68, 70, 72 and toothed wheels 86, 88, 90, 92 with the same toothed wheel modules, gear stage jumps of, for example 20% to 23%, are achieved, wherein for this example the corresponding tooth numbers at 43, 55, 88 and 76 are selected for the first toothed wheel 54, the second toothed wheel 56, the toothed wheel 82 and the toothed wheel 84.

TABLE 1

(Gear assembly 10 with manually shiftable second gear unit 14, axial distance a1 and a2 = 131 mm):

| Gear stage | Gear stage jump [%] |
|---|---|
| 1 | — |
| 2 | 22.5 |
| 3 | 20.9 |
| 4 | 22.5 |
| 5 | 22.2 |
| 6 | 20.2 |
| 7 | 23.2 |
| 8 | 20.2 |

TABLE 2

(Gear assembly 10 with manually shiftable second gear unit 14, axial distance a1 and a2 = 131 mm):

| Synchronized toothed wheel/toothed wheel | Number of teeth |
|---|---|
| 58 | 73 |
| 60 | 67 |
| 62 | 48 |
| 64 | 42 |
| 66 | 73 |
| 68 | 67 |
| 70 | 48 |
| 72 | 42 |
| 86 | 58 |
| 88 | 64 |
| 90 | 83 |
| 92 | 89 |

For the example, shown in Tables 3 and 4, of a combination of the number of teeth of the synchronous gears 58, 60, 62, 64, 66, 68, 70, 72 and toothed wheels 86, 88, 90, 92 with the same toothed wheel modules, gear stage jumps of, for example, 22% to 23% are achieved, wherein for this example the corresponding number of teeth have been selected at 27, 31, 38 and 36 for the first toothed wheel 54, the second toothed wheel 56, the toothed wheel 82 and the toothed wheel 84.

TABLE 3

(Gear assembly 10 with second gear unit 14 as dual clutch transmission, axial distance a1 = a2):

| Gear stage | Gear stage jump [%] |
|---|---|
| 1 | — |
| 2 | 21.2 |
| 3 | 23.0 |
| 4 | 21.2 |
| 5 | 22.5 |
| 6 | 21.2 |
| 7 | 22.1 |
| 8 | 21.2 |

TABLE 4

(Gear assembly 10 with second gear unit 14 as dual clutch transmission, axial distance a1 = a2):

| Synchronized toothed wheel/toothed wheel | Number of teeth |
|---|---|
| 58 | 39 |
| 60 | 32 |
| 62 | 26 |
| 64 | 20 |
| 66 | 39 |
| 68 | 32 |
| 70 | 26 |
| 72 | 20 |
| 86 | 28 |
| 88 | 34 |
| 90 | 41 |
| 92 | 47 |

A second gear unit 14 configured according to Tables 1 and 2 and/or 3 and 4 permits, with the same axial distance of the layshafts 50, 52 (a1=a2), relatively stepless gear stage jumps in the aforementioned range by using modules of the same size for all toothed wheels (58, 60, 62, 64, 66, 68, 70, 72, 86, 88, 90, 92) which involves a cost advantage when producing the toothed wheels. (Minimizing the costs of the set-up time of the gear-cutting machines). Should a smaller deviation be desired, this may be achieved by choosing modules of different sizes for the respective toothed wheel pairs. Determining the number of teeth may take place by way of a computer-assisted method, as a function of a desired gear stage jump and a desired axial distance, as well as a desired toothed wheel module.

However, should variable gear stage jumps also be desired, for example for agricultural vehicles or working vehicles which are mainly intended to be used for transport purposes, then the gear assembly 10 may also be configured with unequal axial distances for the layshafts 50, 52 of the second gear unit 14 (not shown). With unequal radial distances of the layshafts 50, 52 from the input and/or output shaft 46, 48 of the second gear unit 14 (axial distance a1≠a2) variable gear stage jumps may be implemented by the gear assembly 10, both for a gear assembly 10 according to FIG. 1 and for a gear assembly according to FIG. 2. In this case, the opposing synchronous gears on the respective layshafts 50, 52 would no longer have the same diameter but the remaining construction of the gear assembly 10 would remain unaltered. An example of a toothed wheel combination with different radial distances (radial distance a1≠a2) is shown in Tables 5 and 6 for a gear assembly 10 with a second gear unit 14 configured as a dual clutch transmission according to FIG. 2. For the example, shown in Tables 5 and 6, of a combination of the number of teeth of the synchronous gears 58, 60, 62, 64, 66, 68, 70, 72 and toothed wheels 86, 88, 90, 92 gear stage jumps of, for example, 23% to 36% are achieved, wherein for this example the corresponding number of teeth at 45, 51, 86 and 86 are selected for the first toothed wheel 54, the second toothed wheel 56, the toothed wheel 82 and the toothed wheel 84.

TABLE 5

(Gear assembly 10 with second gear unit 14 as dual clutch transmission, axial distance a1 = 131 mm and a2 = 139 mm):

| Gear stage | Gear stage jump [%] |
|---|---|
| 1 | — |
| 2 | 36.6 |
| 3 | 33.0 |
| 4 | 29.2 |
| 5 | 22.6 |
| 6 | 25.9 |
| 7 | 24.4 |
| 8 | 23.9 |

TABLE 6

(Gear assembly 10 with second gear unit 14 as dual clutch transmission, axial distance a1 = 131 mm and a2 = 139 mm):

| Synchronized toothed wheel/toothed wheel | Number of teeth |
|---|---|
| 58 | 86 |
| 60 | 72 |
| 62 | 57 |
| 64 | 39 |
| 66 | 94 |
| 68 | 80 |
| 70 | 65 |
| 72 | 47 |
| 86 | 45 |
| 88 | 59 |
| 90 | 74 |
| 92 | 92 |

By the gear designs shown in FIGS. 1 and 2, a vehicle manufacturer is able to offer a gear assembly 10 which is able to fulfill the most varied applications and requirements in the specific agricultural and working vehicle sector, without having to develop and produce fundamentally different gear designs.

Figure 3:
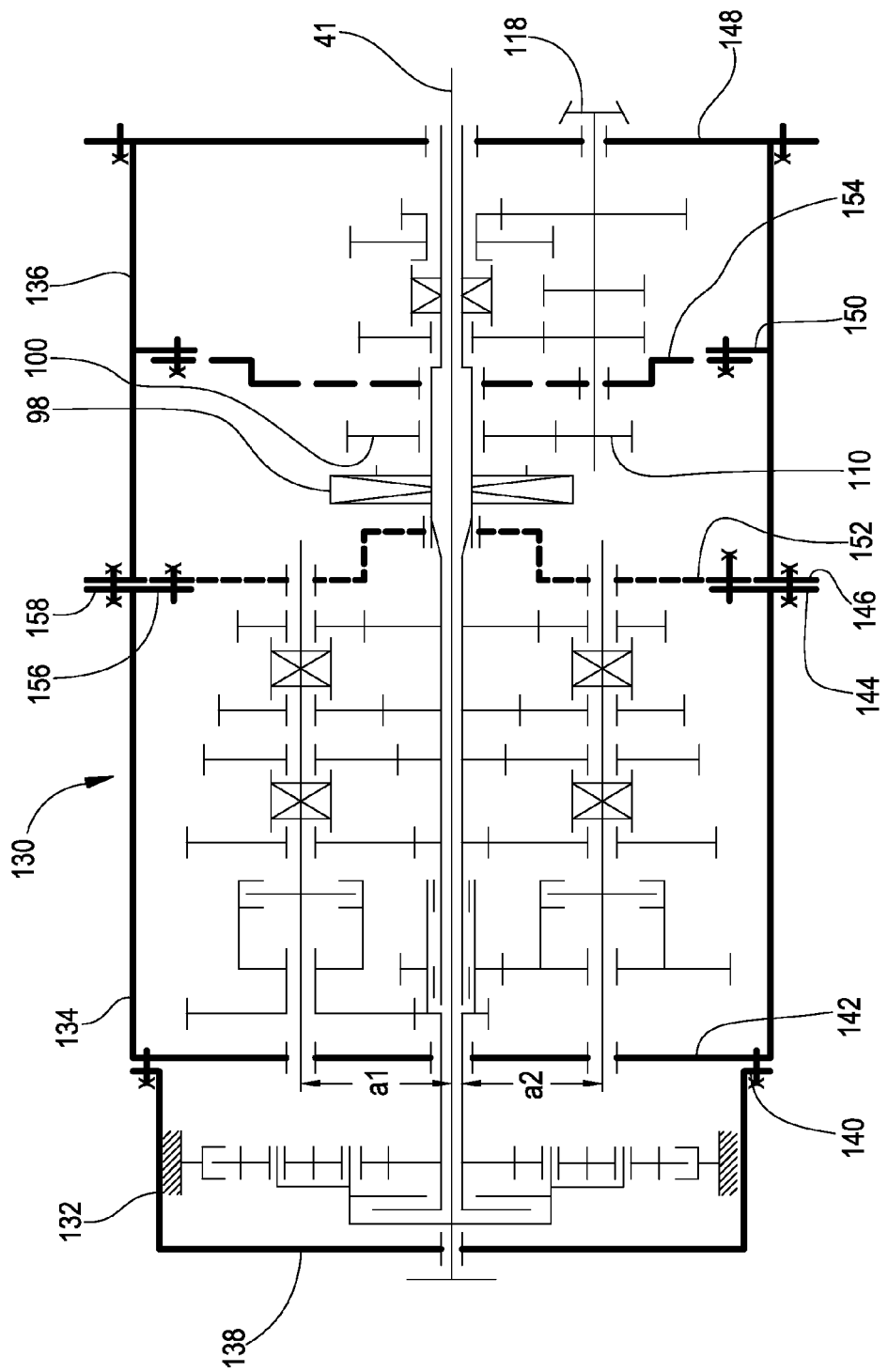
FIG. 3 is a kinematic diagram of a second gear housing arrangement according to the disclosure.

FIG. 3 shows a gear housing arrangement 130 according to the disclosure for a gear assembly 10 according to the exemplary embodiments shown in FIGS. 1 and 2. The gear housing arrangement 130 is modular i.e. it is constructed from a plurality of housing parts or housing modules 132, 134, 136 which may be separated from one another and has a first housing module 132 for the first gear unit 12, a second housing module 134 for the second gear unit 14 and a third housing module 136 for the third gear unit 16. The first housing module 132 comprises a housing wall 138 on the input side and a housing flange 140 on the output side. The second housing module 134 comprises a housing wall 142 on the input side and a housing flange 144 on the output side. The third housing module 136 comprises a housing flange 146 on the input side, a housing wall 148 on the output side and fastening points 150 arranged on the inside therebetween. The housing flange 140 of the first housing module 132 is fastened to the housing wall of the second housing module 134 and the housing flange 146 of the third housing module 136 to the second housing module 134. The gear housing arrangement 130 further comprises a housing bearing wall 152 for the second housing module 134 and a housing bearing wall 154 for the third housing module 136, wherein the housing bearing wall 152 for the second housing module 134 may be fastened to the housing flange 144 of the second housing module 134 and the housing bearing wall 154 for the third housing module 136 may be fastened to fastening points 150 of the third housing module 136 arranged on the inside. The fastening of the individual housing modules to one another takes place via conventional screw connections (not shown) with corresponding seals between the joint faces of the individual housing modules 132, 134, 136. The third housing module 136 is screwed, in the exemplary embodiment shown in FIG. 3, directly to the housing flange 144 of the second housing module 134. The housing flange 144 of the second housing module 134 is dimensioned such that the housing bearing wall 152 for the second housing module 134 is fastened to an inner fastening surface 156 of the housing flange 144 and the housing flange 146 of the third housing module 136 on the input side to an outer fastening surface 158 of the housing flange 144, so that advantageously only one joint face is formed between the second and third housing module 134, 136.

The fastening points 150 of the third housing module 136 arranged on the inside, are arranged inside the housing module 136 such that when the housing module 136 is assembled, the assembled housing bearing wall 154 of the third housing module 136 is arranged between the toothed wheel pair 100, 110 with the clutch device 98 and the toothed wheel pairs 104, 112 and/or 106, 114 with the clutch device 102. Such an arrangement permits a change or replacement of the toothed wheel pair 100, 110 of the clutch device 98 in the third gear unit 16, i.e. the toothed wheel pair 100, 110, with which the maximum output speed may be varied, to be able to be carried out easily and cost-effectively, without the third gear unit 16 having to be completely dismantled.

Figure 4:
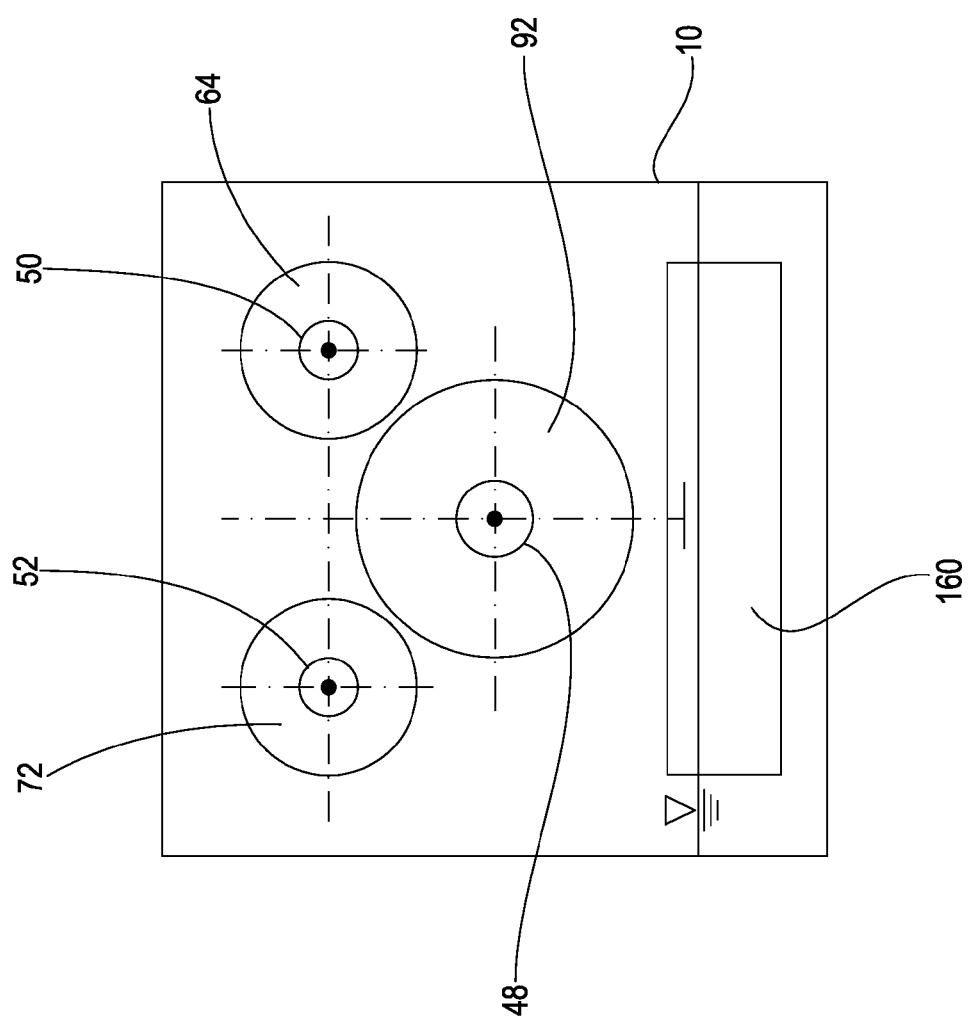
FIG. 4 is a schematic view of a gear cross section of the second gear unit.

The layshafts 50, 52 arranged in the second gear unit 14 are arranged above the input and output shaft 46, 48 relative to the gear housing arrangement 130 shown in FIG. 3, as is illustrated schematically in FIG. 4. The clutch devices 74, 76, 78, 80 in the second gear unit 14 comprise in this case electromagnetic actuators 160, which are arranged below the output shaft 48 relative to the gear housing and/or housing module 134 of the second gear unit 14. The layshafts 50, 52 are thus located in the upper part of the gear housing and/or housing module 134 and are advantageously positioned above the oil level of the gear assembly 10, whereby churning losses may be reduced and/or improved efficiency may be achieved. The electromagnetic actuators 160 which produce shifting forces for synchronizing to the clutch devices 74, 76, 78, 80 and/or which forward the shifting forces to corresponding shifting devices (not shown), are located below the output shaft 48 of the second gear unit 14 in the oil flow of the gear assembly 10 and as a result may be optimally cooled. So that particularly good power shift properties are achieved, in the case of the arrangement of a dual clutch transmission for the second gear unit 14 a separate independently controllable proportional valve is arranged for each clutch device 126, 128.

Figure 5:
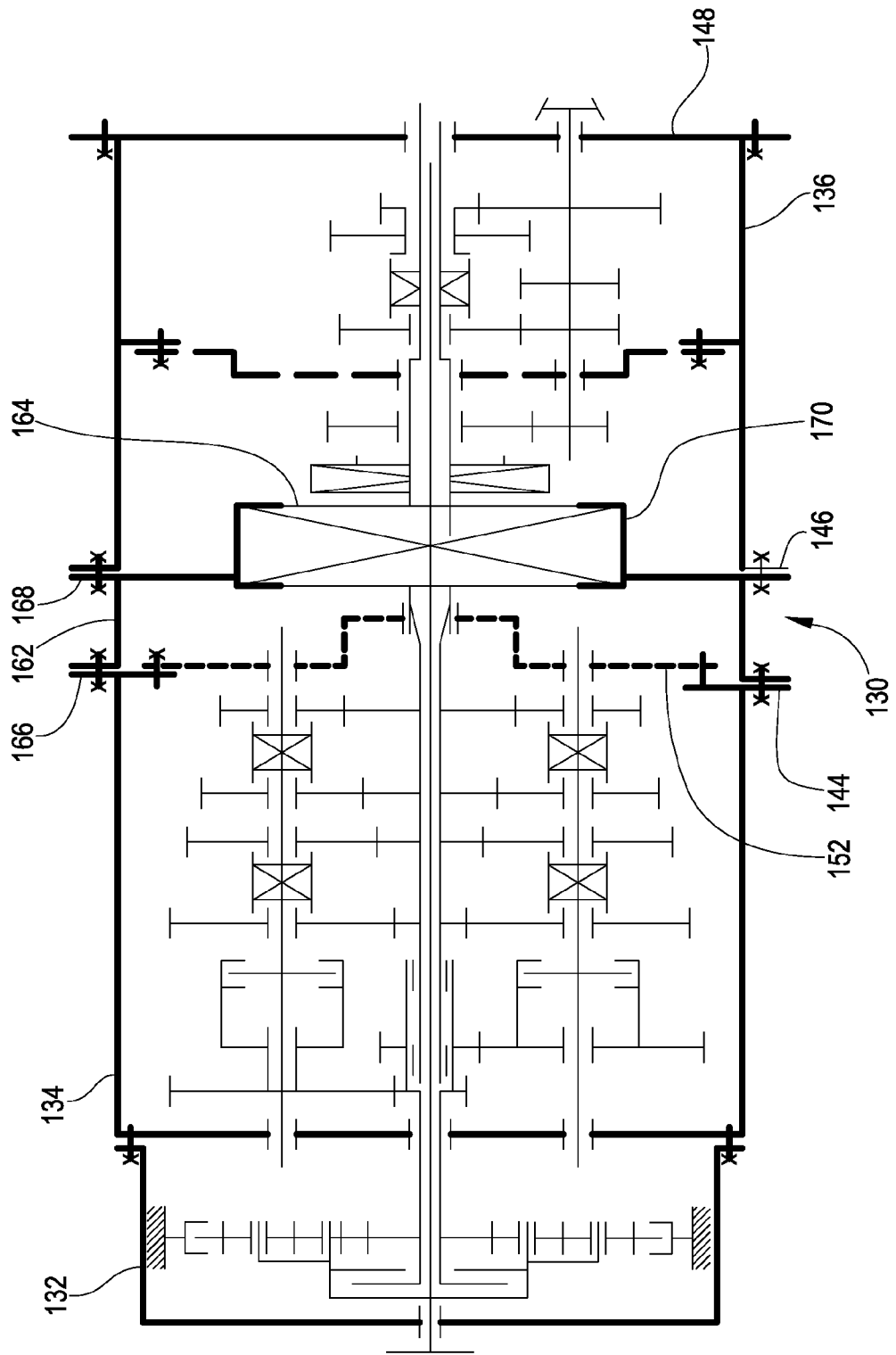
FIG. 5 is a kinematic diagram of a further gear housing arrangement according to the disclosure.

In a further embodiment of the disclosure an intermediate housing module 162 for an intermediate gear unit 164 may be provided which has a housing flange 166, 168 on the input side and on the output side. Such an exemplary embodiment is shown in FIG. 5. The housing flange 166 on the input side is thus designed such that the housing flange may be fastened to the housing flange 144 on the output side or, as described in the exemplary embodiment according to FIG. 3, to the housing bearing wall 152 of the second housing module 134. The housing flange 168 on the output side is designed such that the housing flange may be fastened to the housing flange 146 of the third housing module 136 on the input side. As a result, in the event that, for example, an intermediate gear unit 164 in the form of a crawling gear module or a further reduction gear arrangement is desired, the assembly cost is reduced to a minimum. The intermediate housing module 162 may have corresponding internal bearing points 170, for example in the form of projections or other fastening devices, on which structural elements of the intermediate gear unit 164, such as for example a toothed wheel reduction stage may be mounted.

For a further or fourth gear unit 18, a further housing module (not shown) may be provided which has a housing flange on the input side. The housing flange may be fastened to a connecting flange (not shown) arranged between the housing flange 146 on the input side and the housing wall 148 of the third housing module 136 on the output side. The connecting flange may, for example, be arranged on the underside of the third housing module 136, wherein the fourth gear unit 18 represents a drive module and/or drive unit for a front-wheel drive. The toothed wheel pair 116, 124 extending through the connecting flange and the housing flange of the fourth housing module on the input side, in this case delivers the drive torque required for a front-wheel drive, wherein the toothed wheel pair 116, 124 is produced by the toothed wheel 116 of the third gear unit 16 arranged on the output shaft 96 and by the toothed wheel 124 arranged in the fourth gear unit 18. As already mentioned above, further housing modules (not shown) may also be connected to the existing modular gear housing assembly 130. Thus, for example, a parking brake module may be connected to the third housing module 136 via a further connecting flange, which permits the blocking of the toothed wheel 108 arranged on the input shaft or output shaft 94, 96 of the third gear unit 16. Further connecting options for further housing modules may be provided on the housing wall 148 of the third housing module 136, in order to connect, for example, a differential gear arrangement (not shown) or a power take-off shaft gear (not shown) to the end section 41 of the gear shaft 38 and/or output shaft 96 extending through the housing wall 148 of the third housing module 136.

The design of the gear housing arrangement 130 is accordingly such that a housing wall 142 is formed on the second housing module 134, to which the housing module 132 of the first gear unit 12 formed as a reversing drive, may be fitted. According to the embodiment shown above, the second housing module 134 has on its output side an opening which is sufficiently great that all four shafts 46, 48, 50, 52 of the second gear unit 14 are able to be assembled together with their shifting devices at the same time as one unit. This permits full pre-assembly outside the gear housing arrangement 130 of the four shafts 46, 48, 50, 52 of the second gear unit 14 and the required adjustment of the axial clearance of the synchronized toothed wheels 58, 60, 62, 64, 66, 68, 70, 72 thereof and of the axial clearance of the synchronized units 74, 76, 78, 80. Moreover, in a plurality of different embodiments of the second gear unit 14 (for example as a manual transmission or as a dual clutch transmission), it is possible to monitor the ratios and gear stage jumps in a simple manner before the shafts 46, 48, 50, 52 of the second gear unit 14 are mounted into the housing module 134 and/or the gear housing arrangement 130. The latter avoids possible selection and/or mounting errors.

A gear assembly 10 according to the disclosure and/or gear housing arrangement 130 provides a high degree of flexibility with the choice of the most varied ratios for the individual gear stages and the further stages thereof. Stepless and variable gear stage jumps may be easily implemented and also subsequently easily adapted and/or altered to customer requirements. The efficiency and/or power losses of the gear assembly 10 shown have a discrete continuous path over the entire load range, wherein the best conditions for optimum efficiency are provided by the arrangement shown of the individual components of the gear assembly 10. The adaptation of the maximum speeds in the third gear unit 16 is possible in a particularly simple and accurate manner, so that customer demands and legal requirements may be fulfilled to a wide extent, wherein it is no longer necessary to adapt the ratio of the other gear units connected to the gear housing arrangement, for example that of a differential gear arrangement or that of a front wheel drive.

Having described the preferred embodiment, it will become apparent that various modifications can be made without departing from the scope of the invention as defined in the accompanying claims.

The invention claimed is:

1. A gear assembly for an agricultural vehicle comprising a first gear unit having an output side, a second gear unit having an output side and being coupled to the first gear unit on the output side of the first gear unit, and a third gear unit being coupled to the second gear unit on the output side of the second gear unit, wherein the second gear unit comprises an input shaft, an output shaft and two layshafts, wherein the input shaft of the second gear unit can be brought into driving engagement with the layshafts and the layshafts can be brought into driving engagement with the output shaft of the second gear unit, and wherein the third gear unit comprises an input shaft and an output shaft disposed parallel to the input shaft of the third gear unit, with the input shaft of the third gear unit being selectively brought into driving engagement with the output shaft of the third gear unit, wherein the first gear unit is designed as a planetary gear arrangement having a sun gear, with the sun gear, the input shaft and the output shaft of the second gear unit, and the input shaft of the third gear unit being disposed coaxially with respect to one another, wherein the sun gear serves as an output of the first gear unit and is connected fixedly in terms of rotation to the input shaft of the second gear unit and wherein the output shaft of the second gear unit is connected fixedly in terms of rotation to the input shaft of the third gear unit.

2. The gear assembly as claimed in claim 1, wherein a gear shaft is provided, the gear shaft extending through the gear assembly by way of the first, second and third gear units and serving as an input shaft of the first gear unit and having an end section located outside the third gear unit of the gear assembly where it is available for serving as an input shaft for a further gear unit, wherein the gear shaft as the input shaft is in driving engagement with the first gear unit, and wherein the gear shaft is arranged coaxially to the sun gear, to the input shaft and the output shaft of the second gear unit and to the input shaft of the third gear unit.

3. The gear assembly as claimed in claim 1, wherein the planetary gear arrangement is reversible.

4. The gear assembly as claimed in claim 1, wherein in a further gear unit a further output shaft is arranged in parallel with the output shaft of the third gear unit and is connected to the output shaft of the third gear unit via an additional toothed wheel pair and an additional clutch device connected thereto.

5. The gear assembly as claimed in claim 1, wherein in the second gear unit between the input shaft of the second gear unit and each of the two layshafts a clutch device is arranged, by which the input shaft is able to be brought in driving engagement with the respective layshaft.

6. The gear assembly as claimed in claim 1, wherein an intermediate gear unit is arranged between the second and third gear units, which couples the output shaft of the second gear unit to the input shaft of the third gear unit, wherein the intermediate gear unit comprises a reduction gear which is connected in.

7. The gear assembly as claimed in claim 1, wherein in the third gear unit the input shaft of the third gear unit is able to be brought in driving engagement with the output shaft of the third gear unit via different corresponding toothed wheel pairs, wherein at least one clutch device is provided on one of the input shaft of the third gear unit or the output shaft of the third gear unit, the clutch device permitting a choice of the different corresponding toothed wheel pairs.

8. The gear assembly as claimed in claim 7, wherein in the third gear unit between the input shaft of the third gear unit and the output shaft of the third gear unit a further clutch device with an associated further toothed wheel pair is arranged, by which the input shaft of the third gear unit may be brought in driving engagement with the output shaft of the third gear unit.

9. The gear assembly as claimed in claim 1, wherein in the second gear unit the layshafts may be brought into driving engagement with the output shaft of the second gear unit via different toothed wheel pairs, wherein clutch devices are provided on the layshafts, the clutch devices permitting an activation of selected toothed wheel pairs.

10. The gear assembly as claimed in claim 9, wherein the layshafts arranged in the second gear unit are arranged relative to a housing module of the second gear unit above the input shaft of the second gear unit and output shaft of the second gear unit, wherein the clutch devices in the second gear unit also comprise electromagnetic actuators, which are arranged relative to the housing module of the second gear unit below the output shaft of the second gear unit.

11. The gear assembly as claimed in claim 9, wherein the clutch devices are configured as one of synchronous devices and multi-plate clutches and dog clutches.

12. A gear housing arrangement for a gear assembly as claimed in claim 1, wherein the gear housing arrangement is of modular construction, and comprises a first housing module for the first gear unit, a second housing module for the second gear unit and a third housing module for the third gear unit, wherein the first housing module has a housing wall on the input side and a housing flange on the output side, the second housing module has a housing wall on the input side and a housing flange on the output side, the third housing module has a housing flange on the input side, a housing wall on the output side and fastening points arranged therebetween on the inside, wherein the housing flange of the first housing module may be fastened to the housing wall of the second housing module and the housing flange of the third housing module to the second housing module, and the gear housing arrangement also comprises a housing bearing wall for the second housing module and a housing bearing wall for the third housing module, wherein the housing bearing wall for the second housing module is able to be fastened to the housing flange of the second housing module and the housing bearing wall for the third housing module to the fastening points of the third housing module arranged on the inside.

13. The gear housing arrangement as claimed in claim 12, wherein the third housing module is fastened to one of the housing flange and the housing bearing wall of the second housing module to the second housing module.

14. The gear housing arrangement as claimed in claim 12, wherein the housing bearing wall for the third housing module is arranged between a further toothed wheel pair of a further clutch device and different toothed wheel pairs of at least one clutch device.

15. The gear housing arrangement as claimed in claim 12, wherein an intermediate housing module is provided for an intermediate gear unit, which has a housing flange on the input side and on the output side, wherein the housing flange on the input side is fastened to one of the housing flange and to the housing bearing wall of the second housing module and the housing flange on the output side to the housing flange of the third housing module on the input side.

16. The gear housing arrangement as claimed in claim 12, wherein a further housing module is provided for a further gear unit, the housing module having a housing flange on the input side, wherein the housing flange may be fastened to a connecting flange arranged between the housing flange on the input side and the housing wall of the third housing module on the output side.

17. A gear assembly for an agricultural vehicle comprising a first gear unit having an output side, a second gear unit having an output side and being coupled to the first gear unit on the output side of the first gear unit, and a third gear unit being coupled to the second gear unit on the output side of the second gear unit, wherein the second gear unit comprises an input shaft, an output shaft and two layshafts, wherein the input shaft of the second gear unit can be brought into driving engagement with the layshafts and the layshafts can be brought into driving engagement with the output shaft of the second gear unit, and wherein the third gear unit comprises an input shaft and an output shaft disposed parallel to the input shaft of the third gear unit, with the input shaft of the third gear unit being selectively brought into driving engagement with the output shaft of the third gear unit, wherein the first gear unit is designed as a Planetary gear arrangement having a sun gear, with the sun gear, the input shaft and the output shaft of the second gear unit, and the input shaft of the third gear unit being disposed coaxially with respect to one another, wherein the sun gear is connected fixedly in terms of rotation to the input shaft of the second gear unit, wherein the output shaft of the second gear unit is connected fixedly in terms of rotation to the input shaft of the third gear unit; and wherein the input shaft of the second gear unit and the output shaft of the second gear unit have a common bearing point.

18. A gear assembly for an agricultural vehicle comprising a first gear unit having an output side, a second gear unit having an output side and being coupled to the first gear unit on the output side of the first gear unit, and a third gear unit being coupled to the second gear unit on the output side of the second gear unit, wherein the second gear unit comprises an input shaft, an output shaft and two layshafts, wherein the input shaft of the second gear unit can be brought into driving engagement with the layshafts and the layshafts can be brought into driving engagement with the output shaft of the second gear unit, and wherein the third gear unit comprises an input shaft and an output shaft disposed parallel to the input shaft of the third gear unit, with the input shaft of the third gear unit being selectively brought into driving engagement with the output shaft of the third gear unit, wherein the first gear unit is designed as a planetary gear arrangement having a sun gear, with the sun gear, the input shaft and the output shaft of the second gear unit, and the input shaft of the third gear unit being disposed coaxially with respect to one another, wherein the sun gear is connected fixedly in terms of rotation to the input shaft of the second gear unit, wherein the output shaft of the second gear unit is connected fixedly in terms of rotation to the input shaft of the third gear unit, wherein, in the third gear unit, the input shaft of the third gear unit is able to be brought into driving engagement with the output shaft of the third gear unit via different corresponding toothed wheel pairs, wherein at least one clutch device is provided on one of the input shaft of the third gear unit and of the output shaft of the third gear unit, the clutch device permitting a choice of the different corresponding toothed wheel pairs, and wherein between the input shaft of the third gear unit and the output shaft of the third gear unit, a further clutch device with an associated further toothed wheel pair is arranged, by which the input shaft of the third gear unit may be brought into driving engagement with the output shaft of the third gear unit.

19. A gear assembly for an agricultural vehicle comprising a first gear unit having an output side, a second gear unit having an output side and being coupled to the first gear unit on the output side of the first gear unit, and a third gear unit being coupled to the second gear unit on the output side of the second gear unit, wherein the second gear unit comprises an input shaft, an output shaft and two layshafts, wherein the input shaft of the second gear unit can be brought into driving engagement with the layshafts and the layshafts can be brought into driving engagement with the output shaft of the second gear unit, and wherein the third gear unit comprises an input shaft and an output shaft disposed parallel to the input shaft of the third gear unit, with the input shaft of the third gear unit being selectively brought into driving engagement with the output shaft of the third gear unit, wherein the first gear unit is designed as a planetary gear arrangement having a sun gear, with the sun gear, the input shaft and the output shaft of the second gear unit, and the input shaft of the third gear unit being disposed coaxially with respect to one another, wherein the sun gear is connected fixedly in terms of rotation to the input shaft of the second gear unit, wherein the output shaft of the second gear unit is connected fixedly in terms of rotation to the input shaft of the third gear unit; and including a further gear unit having a further output shaft arranged in parallel with the output shaft of the third gear unit and being connected to the output shaft of the third gear unit via an additional toothed wheel pair and an additional clutch device connected thereto.

* * * * *